United States Patent [19]
Murre et al.

[11] 3,920,332
[45] Nov. 18, 1975

[54] CARTRIDGE OR CASSETTE CONTROL SYSTEM WITH AN AUTOMATIC FINAL RUN AT THE END OF A WEB

[75] Inventors: Robert W. Murre, Chicago; George W. Bookless, Franklin Park, both of Ill.

[73] Assignee: Bell & Howell Company, Chicago, Ill.

[22] Filed: May 28, 1974

[21] Appl. No.: 473,467

[52] U.S. Cl. .................................. 355/64; 352/74
[51] Int. Cl.² .............. G03B 27/32; G03B 27/52; G03B 23/02
[58] Field of Search ............ 355/64, 65, 29; 352/72, 352/74; 242/71.1, 71.6, 191

[56] References Cited
UNITED STATES PATENTS
3,460,891  8/1969  Bley et al. .............................. 355/29
3,771,862  11/1973  Land et al. ......................... 352/74 X Primary Examiner—Richard A. Wintercorn
Attorney, Agent, or Firm—Robert A. Walsh; Gerald B. Epstein

[57] ABSTRACT

A cartridge or cassette is used in an associated machine having a web transport system which prevents cartridge ejection unless the web has been first driven through a final run sequence. A particular use of the invention is in micro-film cameras where the final run winds a sufficient number of layers on the outside of a take-up reel to guard exposed film against ambient light when the cartridge or cassette is removed from the camera.

7 Claims, 5 Drawing Figures

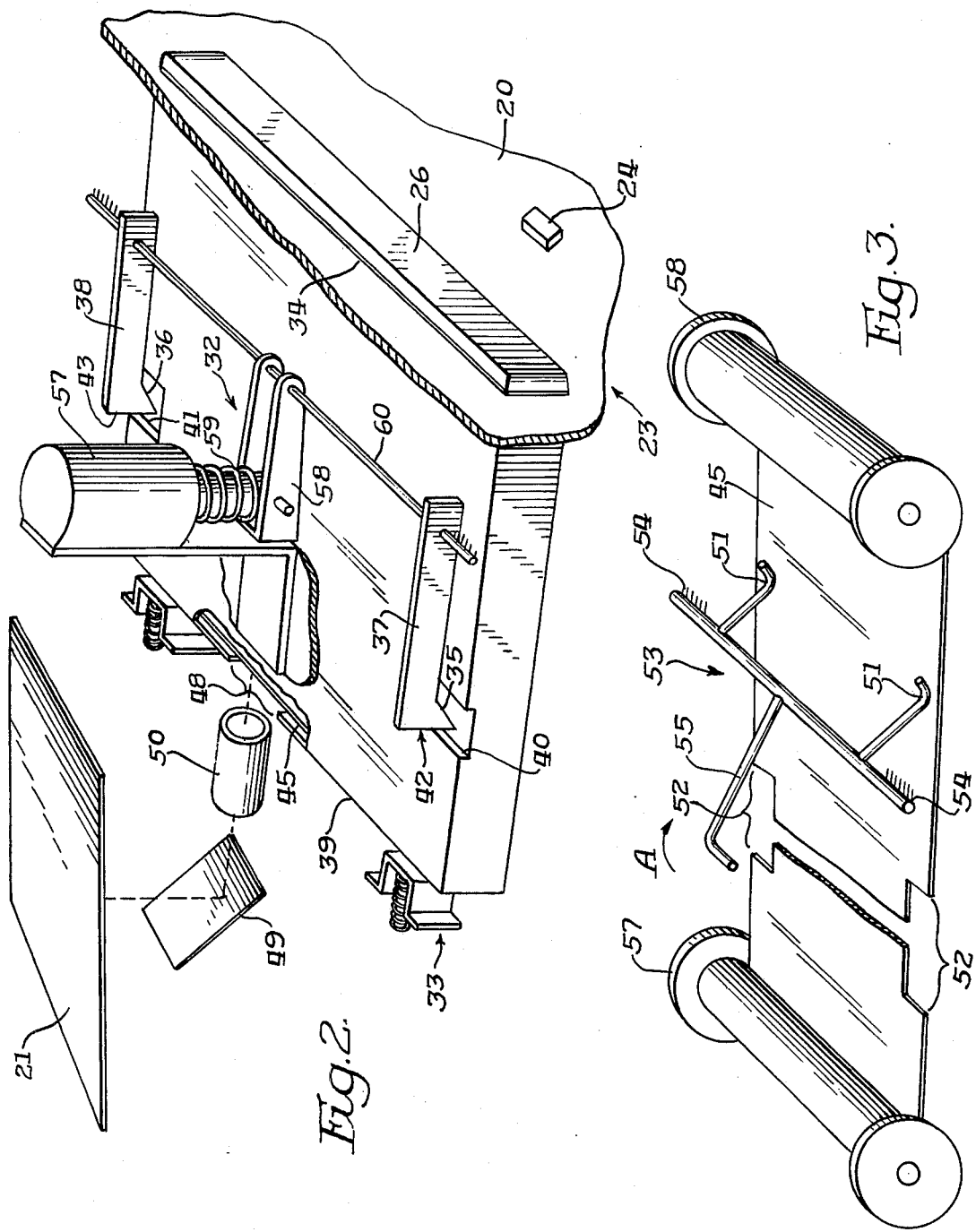

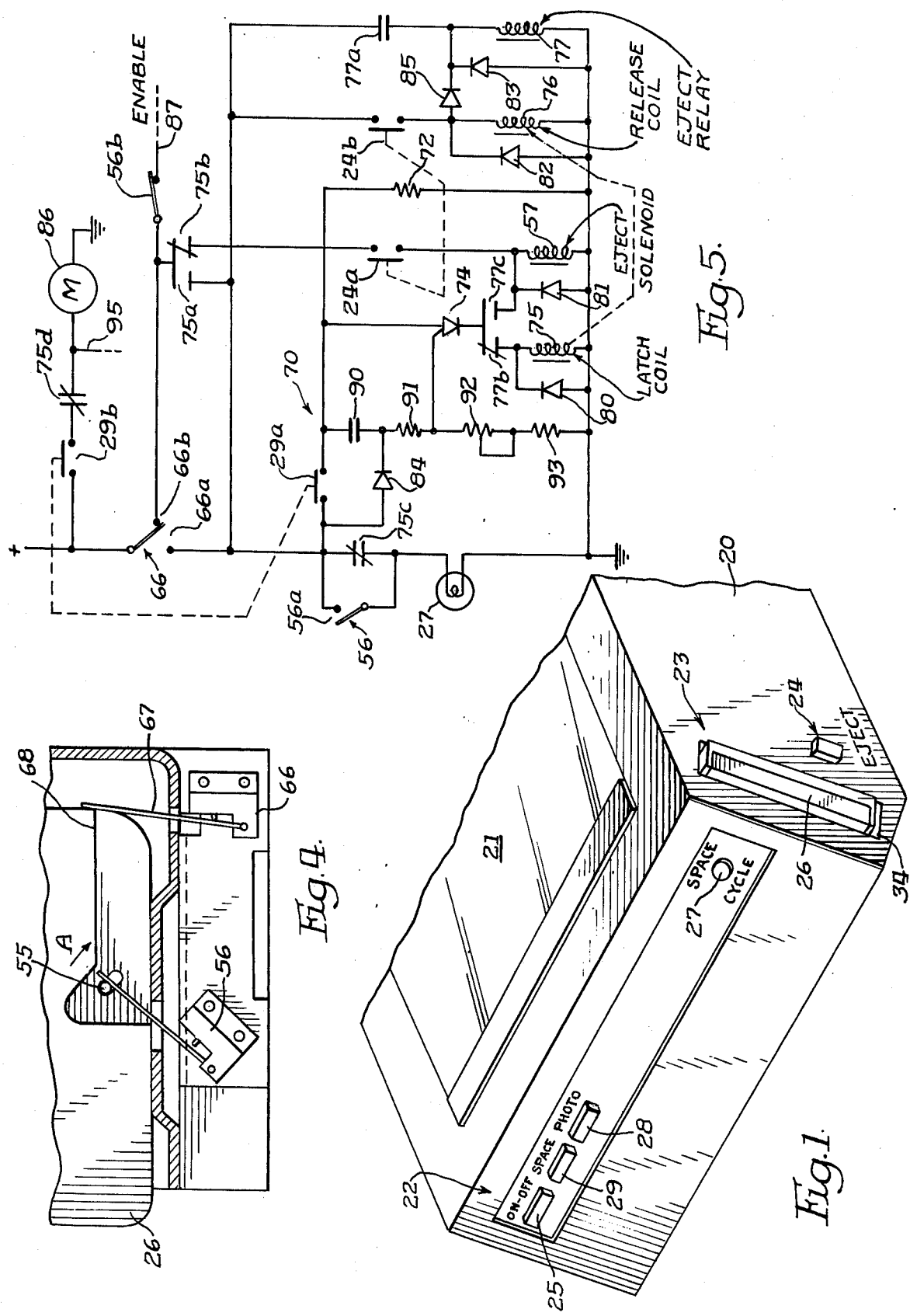

CARTRIDGE OR CASSETTE CONTROL SYSTEM WITH AN AUTOMATIC FINAL RUN AT THE END OF A WEB

This invention relates to web transport control systems and more particularly to means for causing a final end of web run. The invention is especially—although not exclusively—directed to means for causing such a final run at the end of an exposed roll of microfilm.

The term "web" is used herein to mean any suitable kind of tape-like device, such as movie film, microfilm, magnetic tape, or the like. Very often this kind of a web is pre-packaged in a removable cartridge, cassette, or similar device, hereinafter collectively called "cartridge". To install the web in an associated machine, it is only necessary to insert the cartridge into a suitable chamber in the associated machine.

The nature of the associated machine is not too important to the invention. However, to provide a concrete example, it will hereinafter be described as a microfilm camera. These cameras currently tend to be large, cumbersome, and expensive, usually requiring specially trained personnel to maintain and operate them. Therefore, many smaller organizations with relatively low volume of microfilming work cannot afford the time, expense, or manpower necessary to efficiently utilize present microfilming systems. As a result, these smaller organizations have been compelled to send their microfilm work to outside contractors.

For this small user class of customers, compact microfilming equipment is desired with pre-loaded cartridge supplied film. However, many of these cartridges must be threaded into the camera by the operator, thereby causing a loss of time and efficiency. When the operator opens the camera housing, its light sealed chamber is disturbed, thereby enabling light to enter the camera and possibly fog or expose a quantity of film, near the format area or exposure window of the cartridge.

To avoid this unwanted exposure, some manufacturers include a light shield device or curtain which covers the format area when the cartridge is not in the camera housing. However, such cameras include a complicated mechanical system for moving the shield one way when the cartridge is inserted into the camera, and then back again when the cartridge is removed from the camera.

Other manufacturers eliminate the curtain and merely instruct the user to wind a number of guard layers of unexposed film over the exposed film on a take-up reel. Then, only the guard layers are struck by ambient light and the exposed film is protected. Accordingly, for these manufacturers, the transport mechanism of the associated machine transports the web through a full length run, and gives a suitable signal indicating that the operator should remove the cartridge from the associated machine. Another web may thereafter be used simply by inserting a new cartridge into the associated machine.

Sometimes the nature of the associated machine is such that the cartridge must be locked in the machine to prevent premature removal. For example, when the cartridge includes exposed film not protected by a curtain, it is desirable for the associated machine to lock the cartridge in place until after a final "space" run, during which a number of guard layers are wound over the last exposed frames. (For convenience of expression, the term space is used hereinafter to indicate the guard spacing, often six inches of film, between the last exposed frame and the end of the outer guard layer of unexposed film.) For those cartridges with built-in curtains that automatically close upon removal from the camera to prevent any light from reaching the film, the entire length of the film may be used. Thus, it is desirable to eliminate the final space run for this type of cartridge.

Accordingly, an object of the invention is to provide new and improved web transport control systems. In particular, an object is to lock a cartridge in an associated machine until after the machine has completed a final space run. In this connection, an object is to selectively cancel the final space run for some cartridges or cassettes.

Another object of the invention is to provide means for inhibiting the operation of an associated machine when the operator fails to take proper action. Here, an object is to detect the end of a web and to alert the operator to the need for special action, while locking the machine until after such action is completed.

In keeping with an aspect of the invention, these and other objects are accomplished by a machine including a solenoid controlled latch cooperating with one or more keeper slots formed in the housing of a cartridge or cassette. A detector in the cartridge operates when the end of a film or web is detected. Thereafter, a control circuit operates to drive the transport mechanism in the associated machine for a predetermined period of time, to apply a desired number of guard layers over the exposed film on a take-up reel.

The nature of a preferred embodiment for accomplishing these and other objects may be understood best from a study of the following description of the attached drawings, wherein:

FIG. 1 is a perspective view of a fragment of an associated machine (here an exemplary microfilm camera);

FIG. 2 is a schematic view in perspective of the inventive cartridge and latch mechanism;

FIG. 3 is a schematic disclosure of an end of web detector;

FIG. 4 is a plan view showing a cartridge and several feeler controlled switches; and FIG. 5 is a schematic circuit diagram of a final run control device.

An exemplary associated machine (here a microfilm camera) is shown in FIG. 1 as including a suitable housing 20, having a window 21, a control panel 22, a cartridge chamber 23, and a cartridge eject push button 24. The machine is turned on or off by push button 25.

A cartridge 26 is inserted into chamber 23 which is built into the machine or camera 20. Space cycle lamp 27 lights as a visual indication that the web in cartridge 26 must be driven forward to present unexposed film to the camera, in response to which the operator pushes the space button 29. Push button 28 is deactivated until a space cycle has been completed. When the spacing is completed the light 27 goes out. Thereafter, a document, book or other material to be copied on microfilm is placed face downward on window 21. Push button 28 is then operated to trip the camera and make the microfilm exposure.

After all the useable web is transported through the cartridge 26, an end of web detector operates an alarm consisting of a flashing light, on the control panel, and a buzzer. The camera will continue to operate with the alarms if push button 28 is depressed which allows batch completion. When the eject button 24 is operated the audio and visual alarms are shut off and the space cycle lamp 27 is lighted. At this time the cartrdige 26 is not ejected and the camera 20 remains locked. This is because the last exposed microfilm frames would be light struck and ruined if ejection occurred before the guard film was wound onto the take-up reel.

The operator notes the lit condition of space cycle lamp 27 and pushes the space button 29. Responsive thereto, the camera 20 drives the web for a predetermined distance (often 6 inches) until a sufficient number of guard layers are wound over the exposed film. The space cycle lamp 27 goes out at the end of the interval. When the lamp goes out, the cartridge is ejected.

According to the invention, the latching function may be performed by means of the structure (FIG. 2) comprising the cartridge 26, a latching mechanism 32, and spring loaded ejectors 33. The cartridge 26 is inserted into the slot 34 of machine 20, which slot is shaped and dimensioned to receive the cartridge in a position which is precise enough to properly support the film in the format area. As the cartridge 26 goes into the slot 34, cam surfaces 35, 36 on latch bars 37, 38 encounter and ride up and over the leading edge 39 of the cartridge 26. This leading edge 39 encounters and compresses two or more spring loaded ejector devices 33 responsive to a continued insertion of the cartridge 26 into slot 34. The latch bars 37, 38 drop into keeper recesses 40, 41 formed in the upper surface of the cartridge housing 26.

Upon release of the pressure applied by the inserting of the cartridge, the compressed ejectors 33 force the capture surfaces 42, 43 of latch bars 37, 38 against the edges of the keeper recesses 40, 41. Thereafter, the cartridge 26 cannot be released until after the latch surfaces 42, 43 are lifted out of the keeper recesses 40, 41. At this time, film 45 is supported in the format area 48 of the cartridge 26 in a plane where the image of the camera is focused.

The web or film 45 inside cartridge 26 is now driven for a predetermined distance responsive to an actuation of the space push button 29. Thus, all film which was exposed to light before the insertion of cartridge 26 into slot 34 is would onto a take-up device in the cartridge. Lamp 27 lights during the spacing run at the start of the cartridge and goes out at the end of the run. Then, the film is ready for exposure. Any books, documents or other material placed on window 21 are focused on the film 45 in cartridge 26 by means of a suitable mirror 49 and lens system 50.

Thereafter, any suitable number of frames may be sequentially exposed, depending upon the amount of film available for processing.

Means are provided for detecting the end of the web or film. More particularly, a pair of sleigh shaped shoes 51 ride along the outside edges of the film 45, as it is transported through the cartridge 26. Near the end of the film, notches 52 are formed on either side of the film. When that portion of film 45 which is noted at 52 reaches the shoes 51, they drop, rotate a mechanism 53 resting on bearings 54, move pin 55 in direction A, and close a microswitch 56 (FIG. 4) that enables an automatic final run mode of operation for the web transport mechanism. A suitable length of film (such as six inches) is automatically pulled from a supply reel 57 and wound on the take-up reel 58 to guard the exposed film on reel 58 against exposure to ambient light through the format area or window 48.

In the preferred embodiment, the need for the final run is automatically signalled by the lighted lamp 27 and the actual run is under the manual control of the operator. However, it may be made automatic, if desired. The nature of the circuit for causing the final run is seen in FIG. 5. In greater detail, microswitch 56 is operated by pin 55 (FIG. 4) which, in turn, is moved when shoes 51 drop through notches 52 at the end of film at web 45. Another suitable microswitch 66 is operated by a feeler arm 67 which detects the need for the final run responsive to a detection of the shape of the cartridge 26. More particularly, when the window or format area 48 is not covered by a curtain, a corner 68 on cartridge 24 pushes feeler arm 67 to operate microswitch 66. One the other hand, if there is a light tight curtain over the window or format area 48, there is no need for winding guard layers; therefore, the cartridge is formed with a cut-out in corner 68 so that feeder arm 67 does not move and switch 66 does not close. Hence, the failure of switch 66 to operate would cancel the need for a final run.

The contacts of microswithces 56 and 66 are seen on the left hand side of FIG. 5. The non-locking contacts 29a, 29b of the space switch 29 and contacts 24a, 24b of the eject button 24 are seen near the center of FIG. 5. If the cartridge 26 has a curtain so that no final run of guard film is required, contacts 66a are open to disable the circuit of FIG. 5 while contacts 66b are closed to enable the camera by applying a suitable potential to the bus 87.

If there is no such curtain, feeler arm 67 operates switch 66 to close contacts 66a and thereby enable the circuit of FIG. 5 while opening contacts 66b so that the camera must thereafter be enabled via contacts 75a.

The remainder of the componets in the circuit of FIG. 5 include an R-C timer 70, a capacitor charging resistor 72, an electronic switch 74, three relay windings 75, 76, 77 and a solenoid winding 57. One relay has latching characteristics, whereby it operates and locks responsive to energization of a latch winding 75 and releases responsive to an energization of release winding 76. Preferably, a permanent magnet is used to give the latching characteristics. The other relay 77 simply operates when contacts 24b or 77a are closed and releases when both of these contacts are open. The relay contacts have the same reference number as their operating winding with an added letter suffix. Thus, for example, contacts 75a close when winding 75 is energized. Various diodes 80–83 short circuit reverse EMF of the various coils. Diode 84 steers capacitor charging current to the R-C timer. Diode 85 is part of a steering circuit for energizing the relay windings 76, 77. Motor 86 operates the mechanism which transports film through cartridge 26.

With this description of the components, the circuit of FIG. 5 will be understood best from a description of the operation thereof. In greater detail, the cartridge 26 is inserted into the associated machine and switch 66 operates to remove a positive potential formerly applied through contacts 66b to the camera enable bus 87. Switch 66 also closes contacts 66a to enable the circuit of FIG. 5. The camera cannot take any pictures at this time.

Space cycle lamp 27 lights over the circuit traced from supply voltage source through contacts 66a, 75c, and lamp 27 to ground. This lamp indicates that fresh and unexposed film must be run past the format area or window 48. At the same time, capacitor 90 charges over a circuit traced from battery through contacts 66a, diode 84, capacitor 90, and resistor 72 to ground. The capcitor 90 charges to virtually the full potential of the supply, or about (+) 24-volts in one case, with the more positive terminal being that connected to the diode 84, or the lower terminal as shown.

The operator observes the lit condition of the space cycle lamp 27 and pushes and holds the space button 29 (FIG. 1) to close switch 29a, 29b (FIG. 5). A circuit is completed from supply through contacts 29b, 75d and motor 86 to ground to thereby cause film to advance through the cartridge 26. The 24 volt supply voltage is now applied to the upper capacitor 90 terminal, thereby causing the lower terminal to increase its voltage to ground by 24 volts additional. Since the lower terminal was previously charged to 24 volts relative to ground, the total voltage to ground at this terminal becomes 48 volts. This voltage reverse biases diode 84. The capacitor 90 charge then begins to leak off via resistors 91, 92 and 93 to ground. The voltage on the capacitor 90 will eventually become reversed to that described, and therefore capacitor 90 must be of a non-polarized type.

As the charge leaks off capacitor 90, there comes a time when the potential on gate electrode G causes the programmable unijunction transistor (PUT) 74 to switch on. Current then flows from supply through contacts 66a, space switch 29a, PUT 74, normally closed contacts 77b, and the relay latch winding 75 to ground. Relay 75 operates and latches itself in any known manner, as for example, by being held by a permanent magnet. The time delay required before PUT 74 switches on is adjusted by potentiometer 92.

Responsive to the operation of relay 75, contacts 75c open to extinguish the space cycle lamp 27. Contacts 75d open to stop motor 86 and thereby terminate the advance of film through the cartridge 26. Contacts 75b open to disable a circuit to solenoid winding 57 in order to prevent any premature operation thereof. Contacts 75a close to energize the camera enable bus 87. Microfilming may now begin. During the operation of the microfilm camera, the film advance motor 86 is operated over the circuit 95 in any suitable manner (not shown).

Eventually the film reaches a point where the shoes 51 (FIG. 3) of the film detector mechanism drop into the notches 52. The arm 55 swings in direction A to close switch 56 (FIG. 4) (i.e., close contacts 56a and open contacts 56b in FIG. 5). Any suitable end of film signal may then indicate the need to change cartridges; or, the associated machine could go into an automatic final run by causing contacts of switch 56 in parallel with contacts 29a, b to start motor 86. However, the preferred embodiment causes a signal which places control in the hands of the operator. Therefore, the circuit shows that contacts 56a close to light the space cycle signal lamp 27 while contacts 56b open to disable the microfilm camera. If desired, contacts 56a could also light a second lamp to indicate end of film.

Regardless of whether the operator undertakes to replace a cartridge, or merely responds to the end of film signal, or decides to remove a cartridge for any reason which he deems proper, he pushes the eject button 24 to start the ejection processes.

Responsive to operation of the eject push button 24, a circuit is closed which may be traced from supply through contacts 66a, eject button contacts 24b, and release winding 76 to ground. Previously latched relay 75 releases its contacts when the release winding 76 is energized. Contacts 75c close another circuit to light the space cycle lamp 27 to indicate that the film is advancing in the final run mode. This circuit via contacts 75c is redundant to the microswitch contacts 56a described previously relative to the end of the film cycle. However, the contact 75c circuit would be the principal circuit if the cartridge were to be ejected at any time before end of film switch 56 has operated. Contacts 75b are closed at this time, but there is no effect since the cartridge sensing contacts 66b are open. Contacts 75a open to further remove power from the camera enable bus 87. If the eject push button were closed before the end of the film (i.e., switch 56 not operated), the circuit to disable the camera would be required at this time because contacts 56b would still be closed.

Also responsive to the closure of the eject push button contacts 24b, the start cycle relay 77 operates over a circuit traced from battery through contacts 66a, 24b, diode 85, and winding 77 to ground. Relay 77 closes its locking contacts 77a to hold itself operated during the interval while the film is being advanced. Contacts 77b break the path through the latch winding of relay 75 while contacts 77c close to connect the eject solenoid winding 57 to the PUT 74.

The operator observes the still lit condition of space cycle lamp 27 and pushes the space push button 29. As described above, the timer measures a period of time, after which solenoid 57 is energized via the PUT 74 and operated contacts 77c. As seen in FIG. 2, an energization of solenoid 57 raises arm 58, rotates shaft 60, and lifts the latch bars 37, 38 to raise ends 42, 43 out of the keeper notches 40, 41. The compressed springs at 33 are thereby released, and the cartridge 26 is ejected from the camera. When the cartridge 26 is ejected, feeler arm 67 (FIG. 4) is released and switch 66 returns to normal. Contacts 66a open and contacts 66b close to return the camera enable to normal. If there is no film in position in the camera, shoes 51 are not depressed and arm 55 operates microswitch 56 to open contacts 56b to thereby disable the microfilm camera. If a cartridge is used which does not have an end of film detector, any suitable switch (such as normal contacts on microswitch 66) may bridge contacts 56b.

When the end of run cycle is not required (as when a curtain is provided in the format area 48), the eject circuit is completed via normal contacts 75b upon the operation of the eject push button contacts 24a, which close a circuit leading to the eject solenoid 57.

Those skilled in the art will readily perceive many other uses for and modifications of the inventive structure and circuit. Therefore the appended claims are to be construed to cover all equivalent structures falling within the true scope and spirit of the invention.

We claim:

1. A web transport system for use in connection with a cartridge containing said web, said system comprising means for receiving said cartridge, solenoid controlled latch means cooperating with one or more keeper slots formed in the housing of a cartridge for capturing said cartridge, means for driving said web through said cartridge while said cartridge is captured, spacing means for operating said driving means during a predetermined period of time for causing a space run sequence whereby a predetermined length of web is driven through said cartridge, control circuit means to retain said capture and to prevent ejection of said cartridge until the space run sequence has been completed, which holds open a circuit to said solenoid while it operates to drive the web during said predetermined period of time, and means responsive to the end of that period of time for closing the circuit to said solenoid.

2. A web transport system for use in connection with a cartridge containing said web, said system comprising means for receiving and capturing said cartridge, means for driving said web through said cartridge while said cartridge is captured, spacing means for operating said driving means during a predetermined period of time for causing a space run sequence whereby a predetermined length of said web is driven through said cartridge, means for detecting the end of the web for alerting an operator to the need for causing said space run sequence to operate, means for inhibiting the operation of an associated machine until after said run sequence is completed, and means for retaining said capture means and preventing any ejection of said cartridge unless the spacing means has first been operated and the web has been first driven through said space run sequence.

3. A microfilm transport system for use in connection with a cartridge containing said film which can be employed in a microfilm camera, said system comprising means for receiving and capturing said cartridge, means for driving said film through said cartridge while said cartridge is captured, spacing means for operating said driving means during a predetermined period of time for causing a space run sequence whereby a predetermined length of said web is driven through said cartridge, means whereby the space run winds a sufficient number of layers on the outside of an exposed coil of said film to guard the exposed film against ambient light when the cartridge is ejected, means associated with a certain type of said cartridge for eliminating said space run, and means for retaining said capture means and preventing any ejection of said cartridge until said film is driven to the end.

4. A microfilm transport system for use in connection with a cartridge containing said film which can be employed in a microfilm camera, said system comprising means for receiving and capturing said cartridge, means for driving said film through said cartridge while said cartridge is captured, spacing means for operating said driving means during a predetermined period of time and for causing a space run sequence whereby a predetermined length of said web is driven through said cartridge, means whereby the space run winds a sufficient number of layers on the outside of an exposed coil of said film to guard the exposed film against ambient light when the cartridge is ejected, means inhibiting the operation of the camera during said space run, and means for retaining said capture means and preventing any ejection of said cartridge unless the spacing means has first been operated and the web has been first driven through said space run sequence.

5. A microfilm camera including a housing having a window for receiving documents to be copied, a cartridge for containing microfilm, a chamber for receiving said cartridge, means for focusing an image of a document on said window upon the film in the cartridge inserted into said chamber, means for indicating when the film in said cartridge must be driven a predetermined space forward to present unexposed film to the focusing means, means for driving said film for a predetermined period of time adequate to transport a length of film which clears any fogged film and presents said unexposed film to said focusing means, means responsive to an effective exhaustion of the useable film in the cartridge for giving an end of film signal means responsive to said end of film signal for inhibiting the camera so that no further exposure may be made, and means for precluding ejection of the cartridge from the camera until after the last exposed frames which would be light struck and ruined if such ejection occurs prematurely have been protected by guard film wound over the exposed film.

6. The camera of claim 5 wherein the ejection precluding means comprises at least one keeper recess on the cartridge, a latching means, and spring loaded ejector means which force said keeper slots against said latch means when the cartridge is inserted into the camera, said latching means comprising at least one bar with a cam surface which encounters and rides up and over the leading edge of the cartridge as it is inserted into the camera, the leading edge encountering and compressing said spring loaded ejector means responsive to a continued insertion of the cartridge into the camera, the latch bar dropping into the keeper recess and the spring loaded ejector holding it there by pressure upon said cartridge.

7. The camera of claim 6 and timer means, eject command means, means responsive to operation of said eject command means for starting the timer means for measuring a predetermined period of time and for starting the driving of film through said cartridge, and means responsive to said timer means for lifting said latch bar at the end of said predetermined period of time.

* * * * *